US005760336A

United States Patent [19]

Wang

[11] Patent Number: 5,760,336

[45] Date of Patent: Jun. 2, 1998

[54] BURN AND EXPLOSION-RESISTANT CIRCUIT PACKAGE FOR A VARISTOR CHIP

[76] Inventor: Jack Wang, No. 227, Nan-Yang-Hsin Tsun, Nan-Yang Rd., Feng-Yuan City, Taichung Hsien, Taiwan

[21] Appl. No.: 828,598

[22] Filed: Mar. 31, 1997

[51] Int. Cl.[6] .......... H02G 3/08

[52] U.S. Cl. .......... 174/52.1; 174/52.3; 257/683; 257/704; 338/22 R; 338/234

[58] Field of Search .......... 257/683, 727, 257/678, 701, 702, 703, 704; 174/52.1, 52.4, 52.3; 338/21, 22 R, 22 SD, 234, 235, 232

[56] References Cited

U.S. PATENT DOCUMENTS

| | | | |
|---|---|---|---|
| 4,399,452 | 8/1983 | Nakashima et al. | 257/683 |
| 4,664,281 | 5/1987 | Falk et al. | 220/3.8 |
| 4,939,498 | 7/1990 | Yamada et al. | 338/22 R |
| 5,142,265 | 8/1992 | Motoyoshi et al. | 338/22 R |
| 5,233,326 | 8/1993 | Motoyoshi | 338/22 R |

*Primary Examiner*—Kristine P. Kincaid
*Assistant Examiner*—Hung V. Ngo
*Attorney, Agent, or Firm*—Brinks Hofer Gilson & Lione

[57] ABSTRACT

A circuit package for a varistor chip includes a housing made of an electrical insulating and burn-resistant composition. The housing includes a surrounding wall with upright front and rear wall portions and opposite side wall portions which interconnect the front and rear wall portions and which have lower sections that are formed with aligned pairs of wire holes, and a bottom wall connected to a bottom end of the surrounding wall. Each of two electrical contact pieces is disposed inside the housing and is located adjacent to a respective one of the front and rear wall portions of the surrounding wall. The contact pieces receive the varistor chip therebetween and are provided with contact portions that abut against the varistor chip. Each of the contact pieces has opposite sides formed with a pair of contact tabs. Each of the contact tabs is juxtaposed with a respective one of the wire holes and is used to establish external electrical connection with the varistor chip. A cover plate is mounted on a top end of the surrounding wall to seal the housing.

7 Claims, 5 Drawing Sheets

BURN AND EXPLOSION-RESISTANT CIRCUIT PACKAGE FOR A VARISTOR CHIP

BACKGROUND OF THE INVENTION

1. Field of the Invention

The invention relates to a varistor, more particularly to a burn and explosion-resistant circuit package for a varistor chip.

2. Description of the Related Art

Varistors are commonly used for circuit protection purposes. Referring to FIG. 1, a conventional zinc oxide-type varistor is shown to include a varistor chip 10 which is formed as a circular plate having circular front and rear sides that serve as electrical contact faces 11. Each of the contact faces 11 has a contact pin 12 welded thereto for electrical connection purposes. Referring to FIG. 2, the varistor chip 10 is encapsulated within an epoxy coating 20 for electrical ihsulation purposes.

It is noted that the varistor is likely to explode when an excessive amount of current is applied thereto, or when the actual operating voltage exceeds the rated operating voltage of the varistor. In addition, the epoxy coating 20 is liable to burn when the temperature of the varistor increases due to a current leakage condition. It is thus desirable to provide a burn and explosion-resistant circuit package for a varistor chip so that adequate protection for the user and for a circuit load can be attained.

SUMMARY OF THE INVENTION

Therefore, the object of the present invention is to provide a burn and explosion-resistant circuit package for a varistor chip so as to overcome the aforementioned drawbacks commonly associated with the prior art.

Accordingly, the burn and explosion-resistant circuit package of this invention is to be used with a varistor chip and comprises:

- a housing made of an electrical insulating and burn-resistant composition, the housing including a surrounding wall with upright front and rear wall portions and opposite side wall portions which interconnect the front and rear wall portions and which have lower sections that are formed with aligned pairs of wire holes, and a bottom wall connected to a bottom end of the surrounding wall;
- two electrical contact pieces, each of which is disposed inside the housing and is located adjacent to a respective one of the front and rear wall portions of the surrounding wall, the contact pieces cooperatively forming a space adapted to receive the varistor chip therebetween, the contact pieces being provided with contact portions that are adapted to abut against the varistor chip so as to hold the varistor chip in place inside the housing and so as to establish electrical connection between the contact pieces and the varistor chip, each of the contact pieces having opposite sides formed with a pair of contact tabs, each of the contact tabs being juxtaposed with a respective one of the wire holes and being used to establish external electrical connection with the varistor chip; and
- a cover plate mounted on a top end of the surrounding wall to seal the housing.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 2:
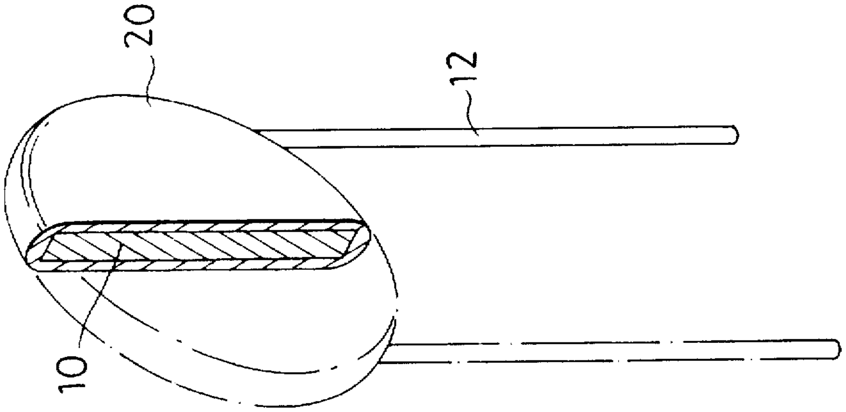
FIG.2 PRIOR ART
FIG. 2 is a partly sectional perspective view illustrating how electrical insulation is achieved in the conventional varistor of FIG. 1.
Figure 1:
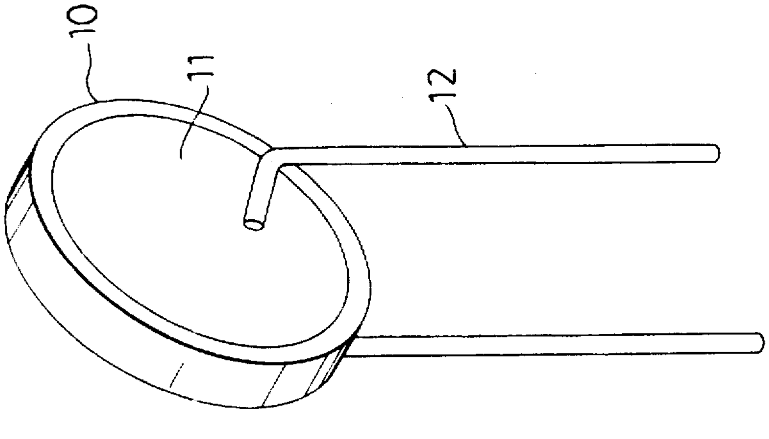
FIG.1 PRIOR ART
FIG. 1 is a perspective view of a conventional zinc oxide-type varistor.

Before the present invention is described in greater detail, it should be noted that like elements are denoted by the same reference numerals throughout the disclosure.

Figure 3:
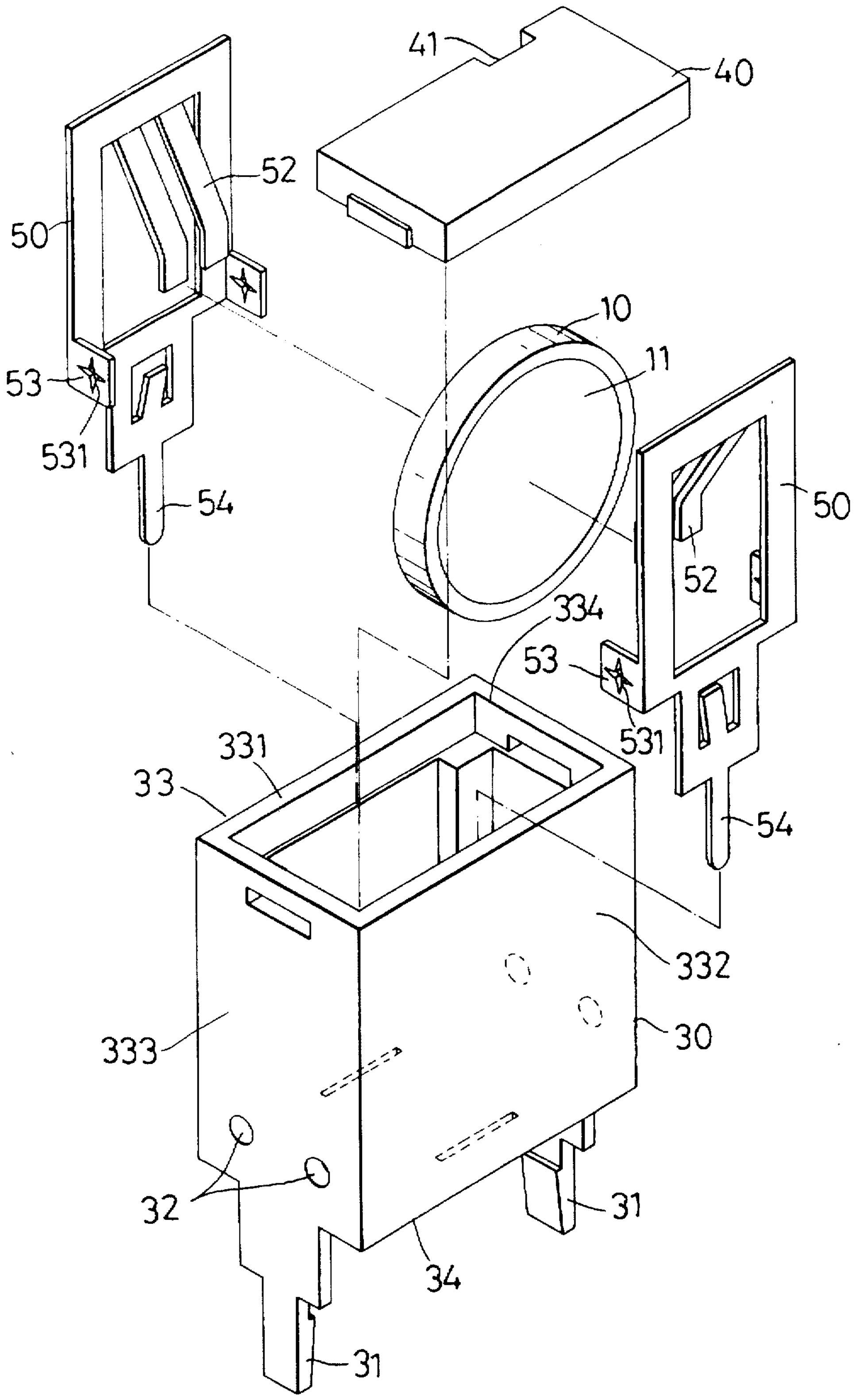
FIG. 3 is an exploded view of the first preferred embodiment of a burn and explosion-resistant circuit package for a varistor chip according to the present invention.
Figure 4:
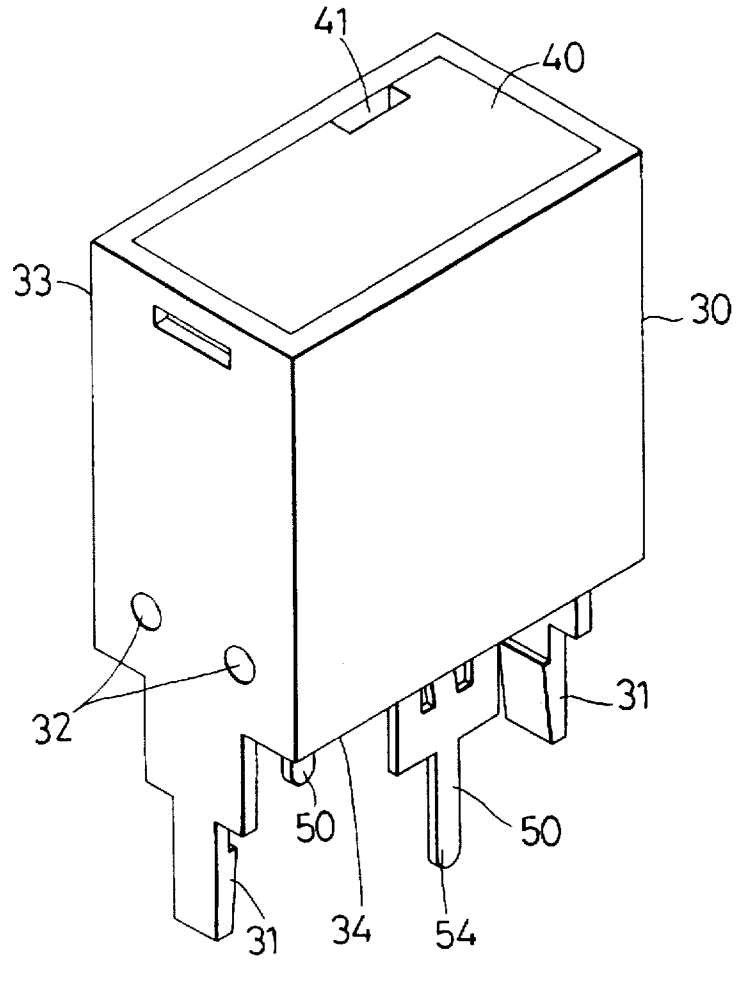
FIG. 4 is a perspective view of the first preferred embodiment to illustrate its assembly.
Figure 5:
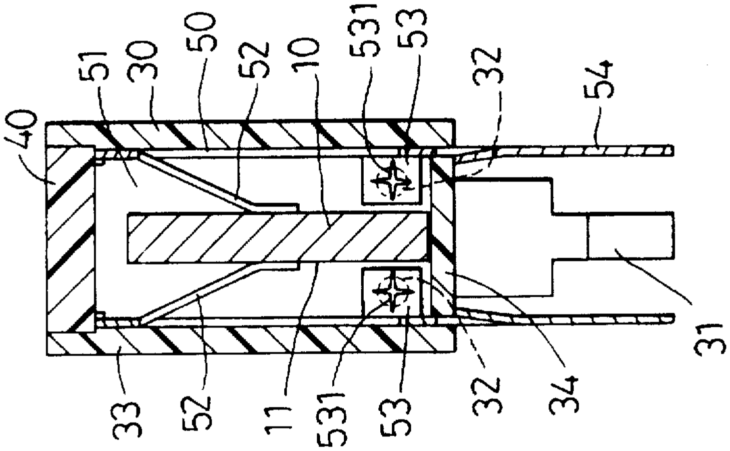
FIG. 5 is a sectional view of the first preferred embodiment to illustrate its use.

Referring to FIGS. 3, 4 and 5, the first preferred embodiment of a burn and explosion-resistant circuit package for a varistor chip 10 in accordance with the present invention is shown to comprise a housing 30, a cover plate 40 and two electrical contact pieces 50.

The housing 30 is made of an electrical insulating and burn-resistant composition. In this embodiment, the housing 30 is made of a composition which contains poly butyelene terephthalate and glass fibers. The housing 30 includes a rectangular surrounding wall 33 with planar upright front and rear wall portions 331, 332 and opposite side wall portions 333, 334 which interconnect the front and rear wall portions 331, 332, and a bottom wall 34 connected to a bottom end of the surrounding wall 33. The opposite side wall portions 333, 334 of the surrounding wall 33 have lower sections that are formed with aligned pairs of wire holes 32. The bottom wall 34 is formed with a spaced pair of downwardly extending mounting legs 31 to permit mounting of the housing 30 on a circuit board (not shown).

Figure 6:
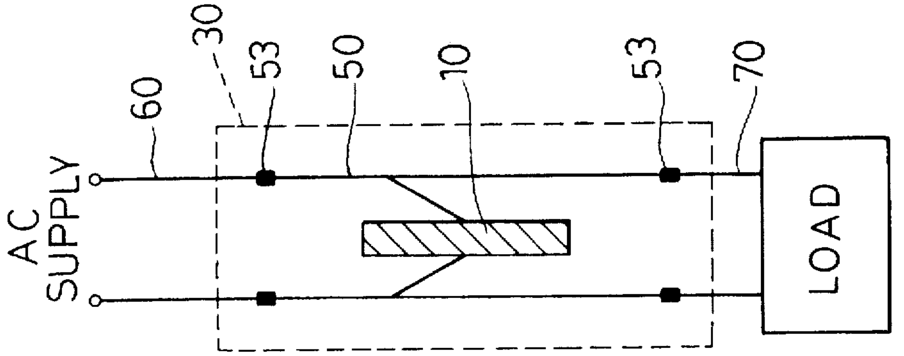
FIG. 6 is a schematic view illustrating the first preferred embodiment when in use.

Each of the electrical contact pieces 50 is disposed inside the housing 30 and is located adjacent to a respective one of the front and rear wall portions 331, 332 of the surrounding wall 33. The contact pieces 50 cooperatively form a space 51 for receiving the varistor chip 10 therebetween. The contact pieces 50 are provided with resilient contact portions 52 which have distal ends that abut against a respective one of the electrical contact faces 11 of the varistor chip 10, thereby holding the varistor chip 10 in place inside the housing 30 and establishing electrical connection between the contact pieces 50 and the varistor chip 10. Each of the contact pieces 50 has opposite sides formed with a pair of contact tabs 53. Each of the contact tabs 53 is juxtaposed with a respective one of the wire holes 32 and is formed with a cross-shaped opening 53. The contact tabs 53 are used to establish external electrical connection with the varistor chip 10. Referring to FIGS. 3 and 6, in use, the terminals 60 of an AC power supply can be extended into the wire holes 32 in one of the side wall portions 333, 334 of the surrounding wall 33 of the housing 30 and into the opening 53 in one of the contact tabs 53 of each of the contact pieces 50 to establish electrical connection with the same. At the same time, the terminals 70 of an electrical load can be extended into the wire holes 32 in the other one of the side wall portions 333, 334 of the surrounding wall 33 and into the opening 53 in the other one of the contact tabs 53 of each of the contact pieces 50 to establish electrical connection therewith. Referring again to FIGS. 3, 4 and 5, each of the contact pieces 50 further has a contact leg 54 that extends downwardly through the bottom wall 34 of the housing 30 to permit welding of the contact pieces 50 on the circuit board.

The cover plate 40 is mounted on a top end of the surrounding wall 33 to seal the housing 30 once the contact pieces 50 and the varistor chip 10 have been installed in the latter. The cover plate 40 has a notched edge 41 which forms a vent hole for the circuit package and which can be used as a polarity indicator for the varistor.

Since the housing 30 is made of an electrical insulating and burn-resistant composition, the housing 30 can prevent scattering of the varistor chip 10 when the latter explodes because of overheating due to current leakage, or because of application of an excessive voltage thereto. In addition, the housing 30 does not burn so that adequate protection for the user and for a circuit load can be attained.

Figure 7:
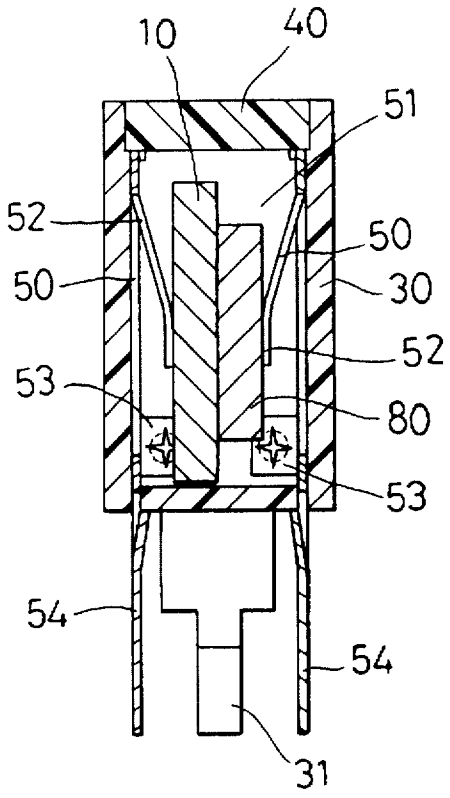
FIG. 7 is a sectional view illustrating the second preferred embodiment of a burn and explosion-resistant circuit package for a varistor chip according to the present invention.

Referring to FIG. 7, in another embodiment of this invention, a varistor chip 10 and another circuit chip, such as a temperature sensitive resistor chip 80, are provided side-by-side in the space 51 formed between the contact pieces 50, thereby resulting in a packaged device which includes series connected circuit components. As such, the circuit package of this invention offers greater flexibility in use.

It should be noted that the number of contact pieces 50 should not be limited to two. For example, in the embodiment of FIG. 7, a third electrical contact (not shown) may be provided between the varistor chip 10 and the resistor chip 80 to permit series or parallel external connection with either of the chips 10, 80.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A burn and explosion-resistant circuit package for a varistor chip, said circuit package comprising:
   - a housing made of an electrical insulating and burn-resistant composition, said housing including a surrounding wall with upright front and rear wall portions and opposite side wall portions which interconnect said front and rear wall portions and which have lower sections that are formed with aligned pairs of wire holes, and a bottom wall connected to a bottom end of said surrounding wall;
   - two electrical contact pieces, each of said contact pieces disposed inside of said housing and located adjacent to a respective one of said front and rear wall portions of said surrounding wall, said contact pieces forming a space adapted to receive the varistor chip therebetween, said contact pieces being provided with contact portions that are adapted to abut against the varistor chip so as to hold the varistor chip in place inside said housing and so as to establish electrical connection between said contact pieces and the varistor chip, each of said contact pieces having opposite sides formed with a pair of contact tabs, each of said contact tabs being juxtaposed with a respective one of said wire holes and being used to establish external electrical connection with the varistor chip; and
   - a cover plate mounted on a top end of said surrounding wall to seal said housing.

2. The circuit package of claim 1, wherein said housing is made of a composition which contains poly butyelene terephthalate and glass fibers.

3. The circuit package of claim 1, wherein said bottom wall is formed with at least one downwardly extending mounting leg.

4. The circuit package of claim 1, wherein said contact portions of said contact pieces are resilient.

5. The circuit package of claim 1, wherein said cover plate has a notched edge which forms a vent hole.

6. The circuit package of claim 1, wherein each of said contact pieces has a contact leg that extends downwardly through said bottom wall of said housing.

7. The circuit package of claim 1, wherein said surrounding wall is rectangular in shape.

* * * * *